INVENTORS
JAMES P. OUSLEY
BY HARRY P. GRIER
Cushman, Darby & Cushman
ATTORNEYS

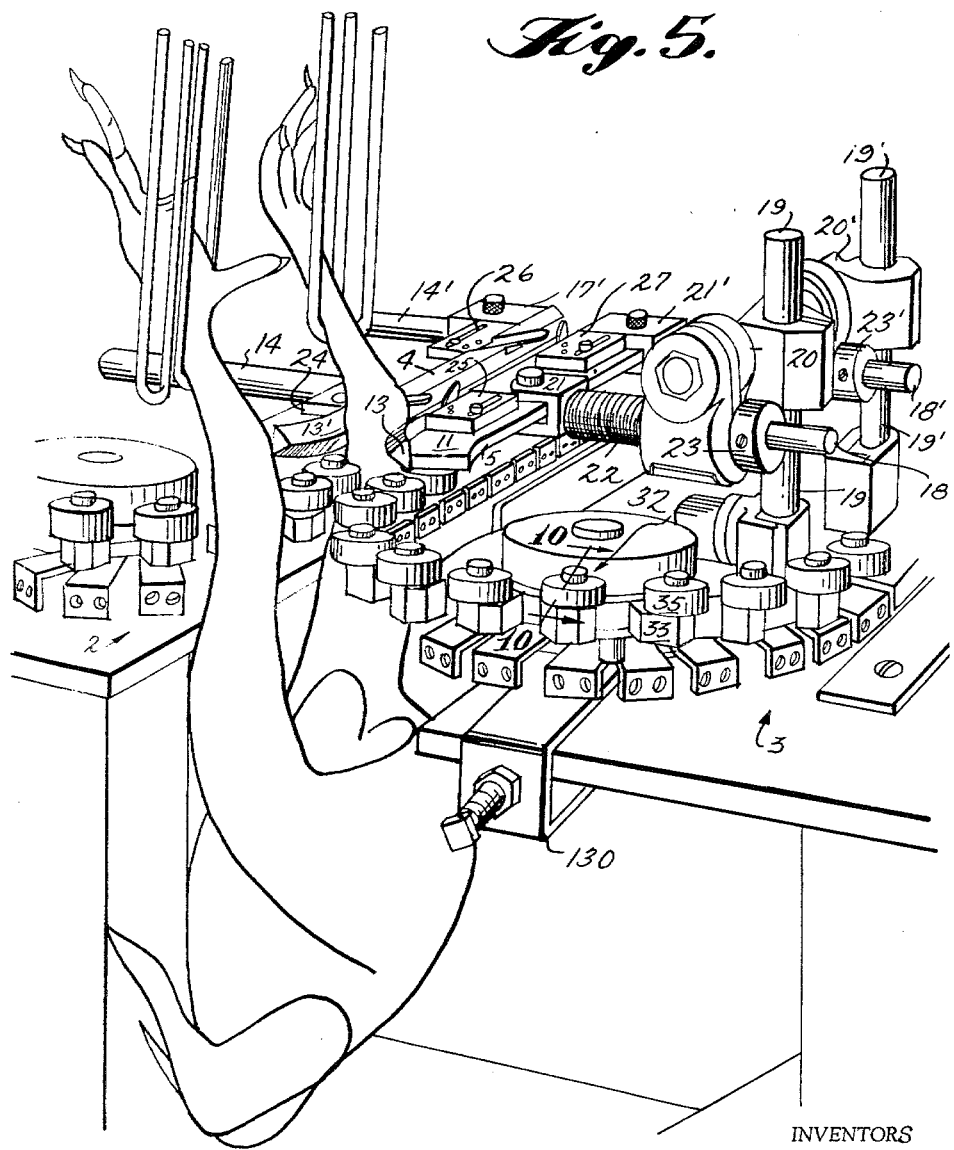

3,199,143
APPARATUS FOR AUTOMATICALLY SEVERING THE INEDIBLE PORTION OF POULTRY LEGS
James P. Ousley, 201 S. Green St., Salisbury, N.C., and Harry P. Grier, 114 S. Center St., Statesville, N.C.
Filed Oct. 22, 1962, Ser. No. 231,991
6 Claims. (Cl. 17—11)

This invention relates to poultry processing and more particularly to apparatus for automatically severing the inedible portion of the leg from a poultry carcass. The apparatus permits severing of the legs substantially at the hock joint and without the necessity of removing the poultry from the conveying line.

In up-to-date poultry processing plants, poultry are carried by an overhead conveyor through the various processing steps of picking the feathers from the birds, removing the viscera, washing and other processing necessary to the preparation of a dressed fowl. The poultry are normally shackled by their legs with the carcass hanging freely, the shackles being suspended by a chain from the overhead conveyor. In some plants, the poultry are shackled by their heads with the carcasses and feet hanging freely.

In the dressing operation, after passage of the poultry through the last washing step, it has been customary for an operator to remove the entire bird from the conveyor and to sever the legs either manually or with an apparatus wherein it is necessary to place the legs of the bird in position beneath a blade. The operator must subsequently actuate the device so that the blade will sever the lower legs at or near the hock joint. In removing the carcasses from the first conveyor, the operator must unfasten the feet and lift down each carcass preparatory to severing the legs.

During the severing operation, the legs are often misaligned and one may be cut shorter than the other. Also, because of the cooperating ridges and grooves on the bones which meet in the hock joint, prior cutting equipment often crushes the bones causing them to sliver. This makes for an unattractive appearance and there is the danger that sharp particles of bone may become lodged in the meat of the carcass.

It is therefore an object of this invention to provide an apparatus for automatically severing the inedible portion of a poultry leg.

It is another object of the present invention to provide such an apparatus whereby the leg is severed at the hock joint without crushing or cutting of the bones therein.

It is still another object of the present invention to provide such an apparatus which may be utilized to remove the legs from poultry suspended on a moving conveyor line and hanging by either their feet or their necks without necessity for modifying the processing line in any manner.

It is a further object of the present invention to provide such an apparatus wherein the various components thereof are adjustable to permit compensation for poultry of different sizes.

It is a still further object of the present invention to provide such an apparatus wherein there is proper advancement of the legs to engagement with the severing elements without jamming of the moving parts.

Additional objects will be apparent to one skilled in the art from the following detailed description of this invention.

Generally speaking, the improved apparatus of the present invention is designed for use with an overhead conveyor-type dressing line and comprises a conveyor means having a passageway which receives the legs of the carcasses. The passageway extends immediately beneath the dressing line, and cutting means or severing elements are disposed along the passageway. The conveyor means is synchronized with movement of the dressing line for moving the poultry leg along the passageway and into contact with the cutting means.

The hock joint in poultry is classified as a hinge joint. The skeletal parts of the distal extremity of the tibiotarsus (the bone contained in what is commonly known as the drumstick) which consiststs of two articular sagittal ridges separated by a shallow and wide articular groove, and the proximal extremity of the tarsometatarsus (the lower leg bone) which consists of two reciprocal sagittal grooves separated by a sagittal spine. The hinge is surrounded by ligaments and the lower portions of the leg muscles extend thereover. Finally, the joint is covered with skin.

It has been found that the hinge joint may be severed without chipping or crushing of the joints if a first cut is made along the front portion of the hinge joint to sever the skin and the extensor digitus longus. This muscle is known commonly as the "leader" muscle. After severing of the leader, it is possible to forcibly separate the mating portions of the bones and associated ligaments within the joint so that a later cut will completely sever the skin and muscles without cutting or crushing the joints. There is, therefore, provided means disposed longitudinally of the passageway for automatically separating the joint after the first cut has been made as described above.

In our presently preferred embodiment, four knives are utilized, the first of which cuts the skin and leader muscle at the front of the joint. The second knife makes a slight cut at the back of the joint while the separating means acts thereon to physically urge apart the normally mating surfaces of the joints. The third knife is spaced substantially from the second knife and makes a deeper cut into the front of the joint. The fourth knife extends substantially across the passageway and finally severs the remaining skin and muscles.

The multiplicity of knives is used in order to prevent chipping or crushing of the bones in the hock joint. Additionally, the knives are spaced such that only one is in contact with the carcass at any one time. The reason for the spacing is that when the legs are presented to a knife there is a shock which tends to cant the shackle if the shock is too great. The canting in turn would raise the second leg so that it might not be presented to the knife in the area of the hock joint. Since the cutting operation is performed by a plurality of knives, the shock to the bird by any one of the severing steps in minimal such that canting of the shackle and/or jamming of the machine is avoided.

The above and other objects and advantages will more fully appear from the following detailed description made of a preferred embodiment in connection with the accompanying drawings, wherein like reference numerals refer to the same or similar parts throughout the several views, and in which:

FIGURE 4 is a cross-sectional view on an enlarged scale taken along line 4—4 of FIGURE 2 and illustrating the means for positioning the poultry legs into proper alignment for severing;

FIGURE 5 is a fragmentary perspective view of the apparatus on an enlarged scale showing the legs in position for the severing step;

FIGURE 9 is an enlarged perspective view of a part of the apparatus of FIGURES 1–8, showing a modified form thereof; and FIGURE 10 is an enlarged view in cross section taken along lines 10—10 in FIGURE 5, showing a part of the apparatus of FIGURES 1–8, showing particularly the means provided for gripping poultry legs while they are severed.

Figure 2:
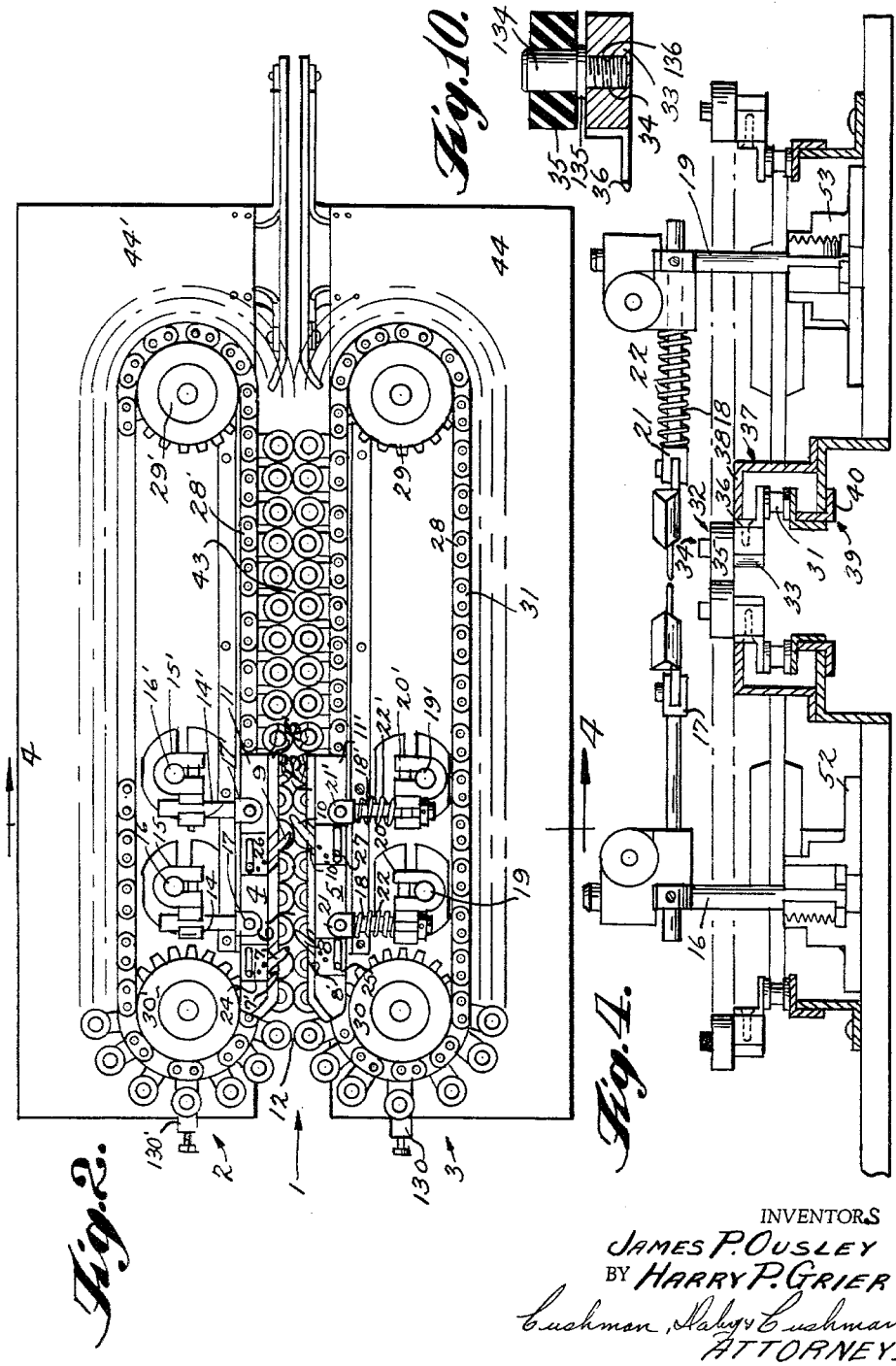
FIGURE 2 is a top plan view of the apparatus of FIGURE 1.

The delegger as seen in FIG. 2 includes a joint-spreading and cutting section 1 and a pair of co-acting conveyors 2 and 3 which advance poultry through section 1.

The spreading and cutting section has a pair of opposed guides 4 and 5 which define a passageway 6 therebetween and four fixed knives 7, 8, 9 and 10 which project into the passageway to sever various portions of the hock joint as it is advanced past them. The guides include generally rectangular horizontal plates 11 and 11' which are more narrow at one end so that the opposed edges of the plates diverge and define an entrance 12 to the passageway 6. Facing members 13 and 13' are fastened to the opposing edges of the plates 11 and 11'; these are triangular in cross section with the apexes of the triangles toward each other and the bases against the plates 11 and 11'. The facing members extend above plates 11 and 11' by approximately the thickness of the plates so that the apexes are at about the same height as the top of the plates. The knives rest on the plates 11 and 11' and pass through slots 7', 8', 9' and 10' in the facing members to coincide with the height of the apexes. Consequently, the triangular facing members press into the center of the hock joint and guide it into alignment with the knives.

Guide 4 is mounted in fixed position but guide 5 is resiliently mounted to apply tension against the hock joint and urge it against guide 4. The mounting for guide 4 includes a pair of horizontal rods 14 and 14', perpendicular to the passageway 6, swivel clamps 15 and 15' and vertical rods 16 and 16'. Swivel clamps 15 and 15' have openings through which the vertical and horizontal rods 14 and 14' and 16 and 16' pass in the respective swiveling members of the clamps, and locking means so that the rods may be moved through the openings and locked in position to adjust the height of the guide and its distance from center passageway 6. Normally, the swivel clamps are set so that rods 14 and 16 and 14' and 16' are at right angles. Horizontal rods 14 and 14' have U-clamps 17 and 17', respectively, at their ends which fit above and below plate 4 and set screws to lock the U-clamps to the rods.

Guide 5 is similarly mounted by horizontal rods 18 and 18', vertical rods 19 and 19', swivel clamps 20 and 20' and U-clamps 21 and 21'. However, in this instance, only the vertical rods are fixed to the swivel clamps; the horizontal rods are freely movable through openings in the clamps. Compression springs 22 and 22' fit around the horizontal rods between the U-clamps and the swivel clamps and urge guide 5 into passageway 6 and against the hock joint in the passageway. Stop rings 23 and 23' are mounted on the outer ends of the horizontal rods to limit inward movement of the guide 5.

The knives 7, 8, 9 and 10 are positioned in staggered relation along the passageway 6 and each knife extends a little further than the preceding knives into the passageway. They are mounted alternately from guides 4 and 5 along the passageway. Each is a flat thin pointed blade which presents a progressively curved edge to the advancing poultry legs and is mounted in a horizontal position inclined inwardly along passageway 6 and away from the entrance 12. The knife blades are adjustable lengthwise along the passageway and are held by hold-down plates 24, 25, 26 and 27 which are screwed or otherwise secured to plates 4 and 5. There are slots 7', 8', 9' and 10' in the facing members 13 and 13' through which the knives pass so that they are approximately aligned with the apexes or pointed inner edges of the triangular facing members or wedges. The conveyors 2 and 3 are link chains 28 and 28' trained around driven sprocket wheels 29 and 29' and free-running sprocket wheels 30 and 30'. Tensioning means 130 and 130' are provided to move wheels 30 and 30' toward and away from wheels 29 and 29'.

As best seen in FIGURE 4, each link 31 carries a lug 32 which coacts with other lugs to grasp the chicken leg. Each lug includes a support plate 33 having an upstanding post 34 mounted therein, an annular cushion 35 of rubber or other resilient material having a flat top and bottom freely rotatably mounted around the post. The post 34 has a ground shaft 134 threaded at a narrower diameter at its lower end to provide a shoulder 135 at the lower end of the ground portion. It is screwed into threaded opening 136 in the top of support plate 33. As seen, the post is enlarged at its top to retain the cushion. The support plate 33 is held to the link 31 by a right angle bracket 36 having a vertical portion attached to the support plate and horizontal portion at the bottom of the support plate attached to the top of the link. The chains are guided in their movement along straight paths adjacent the passageway 6 between the sprocket wheels by track means shown at 37 in FIG. 4 and having two rails. One rail is a horizontal plate member 38 which rests against the vertical portion of right angle bracket 36. Second right angle bracket 39 comprises a horizontal portion attached to the bottom of the link and a depending vertical portion which engages the second rail of the track means; the latter is an elongated angle iron 40 having a vertical portion engaging the vertical portion of bracket 39. Plate means are provided to support these rails. The chains are moved by turning sprocket wheels 29 and 29' by the motor 41 through a worm reduction gear 141 and shafts 42 and 42' which are synchronized through interconnecting shaft coupling 142. Movement of the chain is regulated so that lugs of conveyors 2 advance along passageway 6 of the cutting and spreading station in synchronism with lugs of conveyor 3 and the chains are positioned so that the lugs are close to or lightly press against each other. Similar track means are provided for the return of the chain from driven sprocket 29 to entrance 12.

As seen in FIG. 2 a pair of adjacent lugs of conveyor 2 coacts with a pair of adjacent lugs of conveyor 3 to define a gap 43. When a poultry leg is in this gap, it is held by the two pairs of lugs which press upwardly against the enlarged distal end of the tibiotarsus bone.

Figure 1:
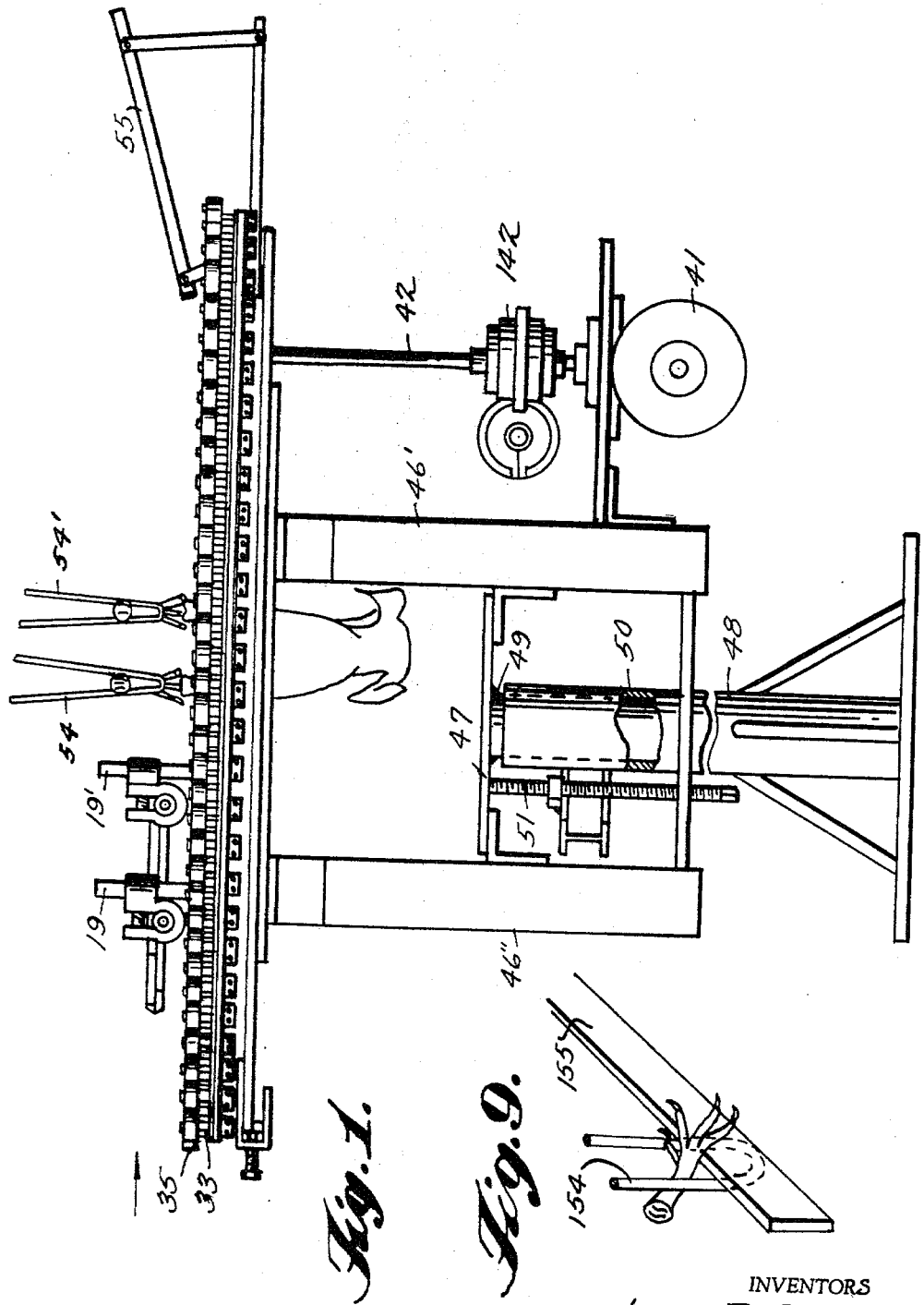
FIGURE 1 is a side elevational view of the leg severing apparatus according to the present invention.
Figure 3:
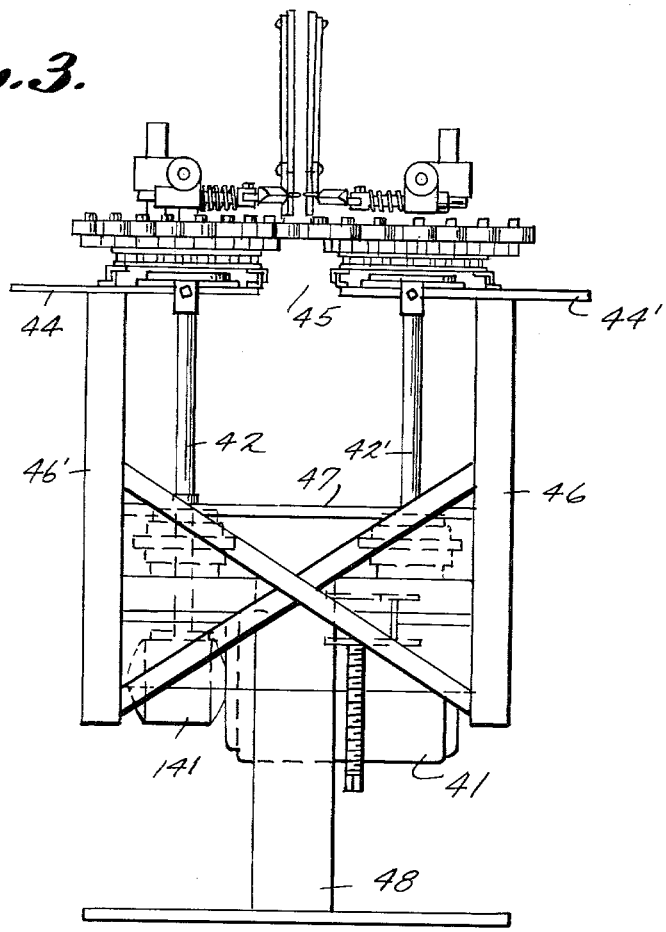
FIGURE 3 is a front elevational view showing the apparatus from the feed-in position.
Figures 6, 7, 8:
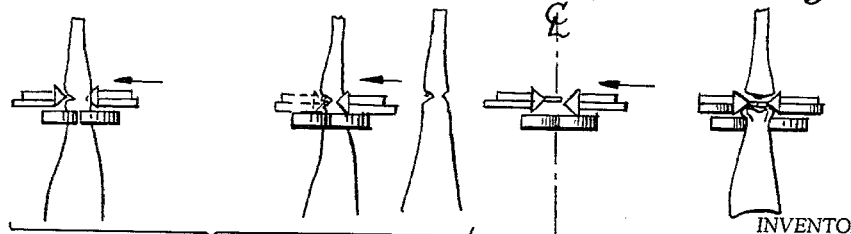
FIGURES 6–8 are views of a poultry leg showing the several severing steps.

The entire assembly is mounted on a stand shown in FIGURES 1 and 3. There is a pair of tables 44 and 44' which are separated by a space 45 for movement of a chicken carcass suspended through passageway 6 between conveyors 2 and 3. The tables rest on legs 46, 46' and 46", which are welded or otherwise secured to horizontal plate 47 which in turn rests on top of a pedestal 48. The pedestial has a telescoping post 49 and cylindrical casing 50. The plate 47 rests on top of post 49, and it may be raised and lowered by a screw jack 51. The conveyors 2 and 3 are supported on the tables and the cutting and spreading station is fastened to the tables by flanges 52 and 53 which hold vertical rods 16 and 19.

Another conveyor (not shown) is suspended above passageway 6 which carries depending shackles having loops 54 and 54'; these grasp the poultry feet. This conveyor is synchronized for movement with conveyors 2 and 3 by means not shown.

In use, poultry legs are suspended from the moving shackles and advanced into entrance 12 of the passageway 6. The legs are picked up by the lugs 32 and grappled in an opening 43 by four lugs. As they move into the passageway 6, the facing members 13 and 13' of the guides 4 and 5 are pressed into the hock joint. Because of the resiliency of the cushions 35, adjustment is made to the length of the enlarged distal end of the tibiotarsus bone so that the facing members 13 and 13' wedge their way toward the gap between it and the tarsometatarsus bone. As the poultry advances to the first knife 7, this knife nicks the skin and severs the leader muscle. When this muscle is severed, it becomes possible for the guides 4 and 5 to force their way into the joint between the bones. The next knife 8 nicks the skin and part of the underlying tissue from the opposite side of the joint to a depth slightly greater than that made by knife 7. Now the joint is continuously spreading further apart and as it strikes knife 9 on the same side of the joint as knife 7, the tissue is severed to near or slightly beyond the center of the joint and finally the remaining tissue is cut by knife 10 which is on the same side of the joint as knife 8. Hence, a combination of cutting and wedging action prys the joint open so that the knives may sever underlying tissue without damaging the bone at the joint.

After the joint is severed, the carcass is moved ahead by the conveyors 2 and 3 to a receiving station beyond the driven sprocket wheels 29 and 29'. Bars 55 and 55' (see FIGURE 2) are provided beyond conveyors 2 and 3 and adjacent the shackles to kick the feet from the shackles. The bars extend along the path of the shackles and on opposite sides of loops 54 and 54'. The bars are inclined upwardly away from the conveyors 2 and 3 so that the severed feet ride up on these and slip out of the loops 54 and 54' and fall into a receptacle (not shown). A single bar 155 may be used alone as shown in FIG. 9 if it is, e.g., magnetized to draw loops 154 against it.

The apparatus is capable of use with all types of domestic poultry including chickens and turkeys and other birds normally used for human consumption. To adapt the apparatus to different sized poultry, it is necessary to adjust the height difference between the spreading and cutting station and the shackles and this is accomplished by raising and lowering the entire apparatus by means of jack 51. The distance between the conveyors 2 and 3 and the lugs 32 beneath the guides 4 and 5 also may have to be adjusted and this can be accomplished by raising or lowering rods 14, 14', 18 and 18'. In addition, the tables 44 and 44' can be moved toward and away from each other to adjust the size of the gap 43 to the size of the poultry leg.

The apparatus is also useful for poultry suspended by their necks. In this case the neck is held in the shackle loop 54 and means are provided to align the free-swinging legs with passageway 6 as a bird is advanced to entrance 12. This may be a plate in front of the entrance which is in horizontal line with the passageway 6 inclined downwardly from conveyor 2 toward conveyor 3. The claws drag on the plate and and turn the bird so that the feet are in line with the passageway and are sequentially grasped by conveyors 2 and 3.

The invention has been described by reference to preferred embodiments but it will be appreciated that various changes and modifications may be made in the details of construction and mode of operation without departing from the scope of the invention as this is defined in the claims. For example, cutting means other than knives may be used.

What is claimed is:

1. Apparatus for severing the inedible portion of a poultry leg from the edible portion thereof which comprises
   conveyor means for grasping the poultry leg above and below the hock joint and for advancing the poultry in a predetermined path,
   opposed wedges mounted along said predetermined path for engaging said poultry leg at said hock joint,
   means for pressing said wedges continuously into said hock joint to separate the bones connected at said joint,
   and cutting means mounted along said predetermined path and extending into said path and between said bones,
   whereby said cutting means will sever tissue at said joint.

2. Apparatus as set forth in claim 1 in which said wedges are elongated and extend along said perdetermined path.

3. Apparatus as set forth in claim 1 in which said cutting means is at least one knife mounted along said predetermined path and in line with the apex of said wedges.

4. Apparatus as set forth in claim 1 in which said conveyor means includes a first conveyor for grasping the poultry leg above the hock joint and a second conveyor having spaced lugs for grappling said leg below said hock joint.

5. Apparatus as set forth in claim 4 including means for vertically adjusting the distance between said first and second conveyors.

6. Apparatus as set forth in claim 1 in which said cutting means is a plurality of knives spaced along said predetermined path, each succeeding knife extending further into said path.

References Cited by the Examiner
UNITED STATES PATENTS

| | | | |
|---|---|---|---|
| 2,844,844 | 7/58 | Sieczkiewicz | 17—45 |
| 2,855,624 | 10/58 | Jerome et al. | 17—11 |
| 3,038,197 | 6/62 | Turner | 17—11 |
| 3,057,006 | 10/62 | Cutrera | 17—45 |

SAMUEL KOREN, *Primary Examiner.*

LUCIE H. LAUDENSLAGER, *Examiner.*